(12) United States Patent  
Lee et al.

(10) Patent No.: US 12,075,374 B2  
(45) Date of Patent: Aug. 27, 2024

(54) METHOD AND APPARATUS FOR SYNCHRONIZATION IN WIRELESS COMMUNICATION SYSTEM

(71) Applicant: ELECTRONICS AND TELECOMMUNICATIONS RESEARCH INSTITUTE, Daejeon (KR)

(72) Inventors: In Hwan Lee, Daejeon (KR); Dong Hyun Ahn, Daejeon (KR); Hyung Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 514 days.

(21) Appl. No.: 17/511,095

(22) Filed: Oct. 26, 2021

(65) Prior Publication Data

US 2022/0132448 A1    Apr. 28, 2022

(30) Foreign Application Priority Data

Oct. 27, 2020  (KR) .................. 10-2020-0140675  
Oct. 26, 2021  (KR) .................. 10-2021-0143986

(51) Int. Cl.  
*H04W 56/00* (2009.01)

(52) U.S. Cl.  
CPC ....... *H04W 56/001* (2013.01); *H04W 56/004* (2013.01)

(58) Field of Classification Search  
CPC ............. H04W 56/001; H04W 56/004; H04W 56/0015  
See application file for complete search history.

(56) References Cited

U.S. PATENT DOCUMENTS

| 5,041,966 | A | 8/1991 | Nakai et al. |
| 8,095,161 | B2 | 1/2012 | Sandberg |
| 8,553,676 | B2 * | 10/2013 | Futaki ............... H04W 56/0055 370/350 |

(Continued)

FOREIGN PATENT DOCUMENTS

| CN | 101406076 B | 6/2010 | |
| CN | 111132057 A * | 5/2020 | .............. H04W 4/38 |

(Continued)

*Primary Examiner* — Chi H Pham  
*Assistant Examiner* — Vladislav Y Agureyev  
(74) *Attorney, Agent, or Firm* — LRK PATENT LAW FIRM

(57) ABSTRACT

A synchronization method performed by a first communication node may include: receiving, from a second communication node of the communication system, a first synchronization information signal including information on a first synchronization reference time and information on a first offset; identifying information on a first time at which the first synchronization information signal is transmitted and information on a target synchronization time configured by the second communication node, based on the information included in the first synchronization information signal; setting a synchronization timer based on the information on the first offset; and when the synchronization timer expires, determining that time synchronization with the second communication node is acquired.

15 Claims, 7 Drawing Sheets

(56) References Cited

U.S. PATENT DOCUMENTS

| | | | |
|---|---|---|---|
| 8,600,420 B2 | 12/2013 | Lee et al. | |
| 9,408,172 B2 | 8/2016 | Gupta | |
| 9,490,926 B2 | 11/2016 | Kim et al. | |
| 9,655,072 B2 | 5/2017 | Abraham et al. | |
| 9,692,614 B2 | 6/2017 | Kim et al. | |
| 9,999,011 B1* | 6/2018 | Donovan | H04W 4/80 |
| 11,503,560 B2* | 11/2022 | Yin | H04J 3/0667 |
| 11,564,186 B2* | 1/2023 | Morsy | H04W 56/0015 |
| 11,658,798 B1* | 5/2023 | Kratz | H04L 7/0016 |
| | | | 375/368 |
| 11,736,969 B2* | 8/2023 | Qin | H04W 28/0221 |
| | | | 370/311 |
| 2014/0044118 A1* | 2/2014 | Kim | H04W 56/0005 |
| | | | 370/338 |
| 2015/0271771 A1* | 9/2015 | Park | H04W 56/0015 |
| | | | 370/350 |
| 2016/0095074 A1* | 3/2016 | Park | H04W 56/001 |
| | | | 370/350 |
| 2016/0315696 A1* | 10/2016 | Lee | H04B 10/032 |
| 2016/0353399 A1* | 12/2016 | Zhao | H04W 4/70 |
| 2018/0279237 A1* | 9/2018 | Kim | H04L 27/2626 |
| 2019/0098520 A1* | 3/2019 | Kim | H04W 76/27 |
| 2019/0191403 A1* | 6/2019 | Goel | H04L 27/2695 |
| 2019/0208381 A1* | 7/2019 | Booij | G01S 1/725 |
| 2019/0223241 A1* | 7/2019 | Manolakis | H04W 72/542 |
| 2019/0281568 A1 | 9/2019 | Jung et al. | |
| 2019/0394017 A1* | 12/2019 | Seo | H04L 69/28 |
| 2019/0394739 A1* | 12/2019 | Seo | H04W 56/005 |
| 2020/0059963 A1* | 2/2020 | Damnjanovic | H04W 56/001 |
| 2020/0137705 A1* | 4/2020 | Takeda | H04W 56/0015 |
| 2020/0259896 A1* | 8/2020 | Sachs | H04W 12/04 |
| 2020/0367163 A1* | 11/2020 | Qu | H04W 52/028 |
| 2021/0014895 A1* | 1/2021 | Wu | H04L 1/0067 |
| 2021/0022008 A1* | 1/2021 | Jeon | H04W 56/0015 |
| 2021/0153151 A1* | 5/2021 | Yin | H04W 56/005 |
| 2021/0176720 A1* | 6/2021 | Chae | H04W 92/18 |
| 2021/0185628 A1* | 6/2021 | Huang | G01S 19/05 |
| 2021/0212009 A1* | 7/2021 | Wu | H04W 56/0055 |
| 2021/0212101 A1* | 7/2021 | Jiang | H04W 72/0453 |
| 2021/0243713 A1* | 8/2021 | Ellenbeck | H04W 56/002 |
| 2022/0124654 A1* | 4/2022 | Takeda | H04W 72/121 |
| 2023/0180163 A1* | 6/2023 | Kim | H04W 92/18 |
| | | | 370/503 |
| 2023/0254110 A1* | 8/2023 | Kratz | H04L 7/0016 |
| | | | 375/368 |

FOREIGN PATENT DOCUMENTS

| | | | | |
|---|---|---|---|---|
| CN | 112715023 A | * | 4/2021 | H04B 7/01 |
| CN | 111132057 B | * | 9/2023 | H04W 4/38 |
| EP | 3163788 A1 | | 5/2017 | |
| EP | 2979468 B1 | * | 5/2018 | H04W 52/0225 |
| EP | 3629639 A1 | * | 4/2020 | H04W 56/0015 |
| EP | 3883150 A1 | * | 9/2021 | G01S 5/00 |
| ES | 2781469 T3 | * | 9/2020 | H04W 56/00 |
| KR | 10-0636385 B1 | | 10/2006 | |
| KR | 10-2019-0106050 A | | 9/2019 | |
| TW | 201311025 A | * | 3/2013 | H04W 52/0216 |
| WO | WO-2016181198 A1 | * | 11/2016 | H04L 5/1469 |
| WO | WO-2017007285 A1 | * | 1/2017 | H04L 5/0048 |
| WO | WO-2018062850 A1 | * | 4/2018 | H04B 7/18523 |
| WO | WO-2020079763 A1 | * | 4/2020 | H04W 56/0045 |
| WO | WO-2020085853 A1 | * | 4/2020 | H04W 56/001 |
| WO | WO-2020119214 A1 | * | 6/2020 | H04W 56/001 |
| WO | WO-2020159325 A1 | * | 8/2020 | G01S 5/0268 |

\* cited by examiner

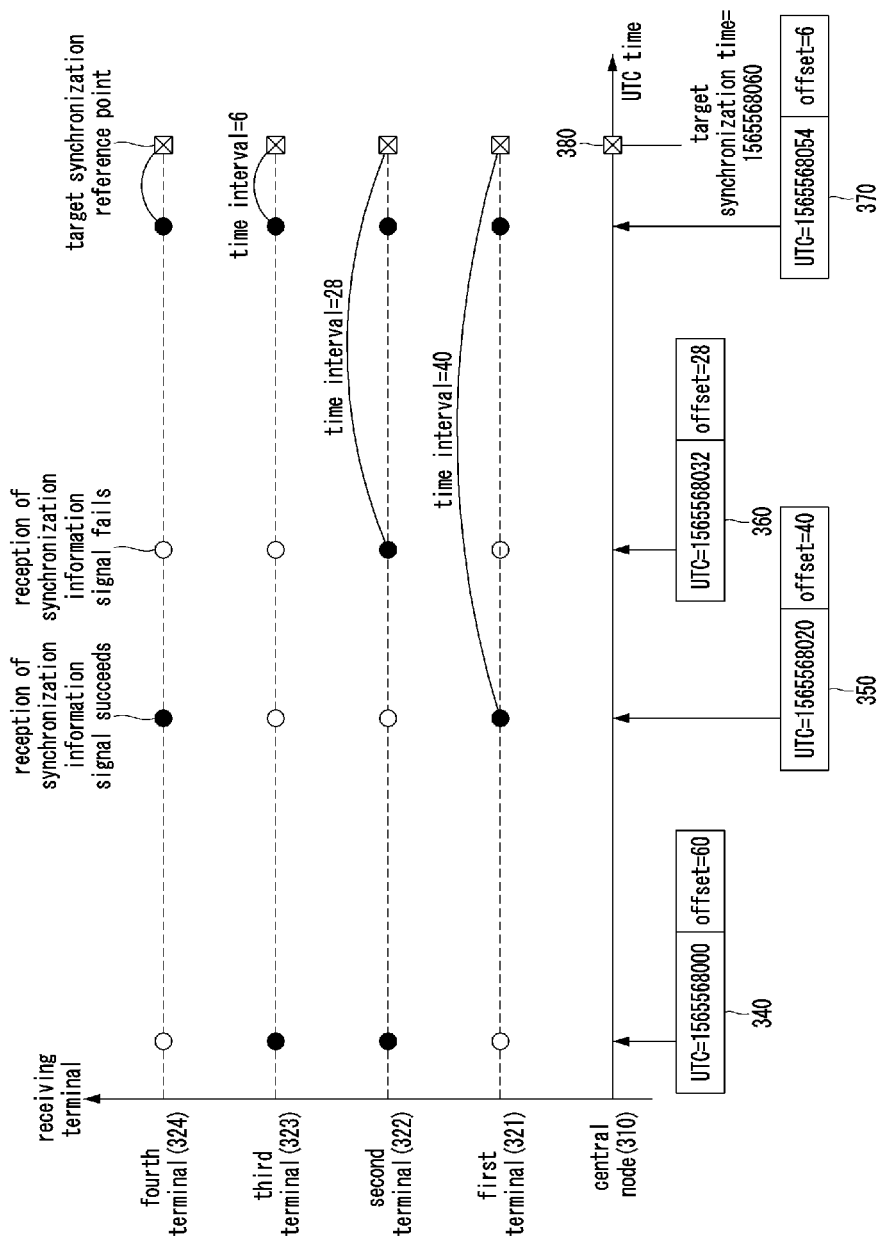

METHOD AND APPARATUS FOR SYNCHRONIZATION IN WIRELESS COMMUNICATION SYSTEM

CROSS-REFERENCE TO RELATED APPLICATIONS

This application claims priority to Korean Patent Applications No. 10-2020-0140675 filed on Oct. 27, 2020 and No. 10-2021-0143986 filed on Oct. 26, 2021 with the Korean Intellectual Property Office (KIPO), the entire contents of which are hereby incorporated by reference.

BACKGROUND

1. Technical Field

The present disclosure relates to a synchronization technique in a wireless communication system, and more particularly, to a technique for terminals to efficiently perform synchronization operations through wireless channels in a wireless communication system.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

Meanwhile, an embodiment of the communication system may support Internet of Things (IoT) technology. The IoT technology may refer to a technology for connecting various things through wireless communications by embedding sensors or communication functions in the various things, and performing controls one the various things such as information acquisition or command transmission. In an IoT communication network that may include a plurality of communication nodes, it may be difficult for each of the communication nodes to include a high-performance device for synchronization due to cost problems. Accordingly, it may not be easy to maintain synchronization between the communication nodes. However, in an IoT communication network used in a specific situation, such as a construction site or an industrial site, operations such as collection of measurement data and transmission of command signals may have to be performed in a time-synchronized state. In this reason, a technique for efficiently performing a synchronization operation through signal transmission and reception between communication nodes constituting a wireless communication network may be required.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a method and an apparatus for synchronization, which enable terminals to efficiently perform synchronization operations through wireless channels in a wireless communication system.

According to an exemplary embodiment of the present disclosure for achieving the above-described objective, a synchronization method performed by a first communication node in a communication system may comprise: receiving, from a second communication node of the communication system, a first synchronization information signal including information on a first synchronization reference time and information on a first offset; identifying information on a first time at which the first synchronization information signal is transmitted and information on a target synchronization time configured by the second communication node, based on the information included in the first synchronization information signal; setting a synchronization timer based on the information on the first offset; and when the synchronization timer expires, determining that time synchronization with the second communication node is acquired.

The first synchronization reference time included in the first synchronization information signal may corresponds to the first time, and the first offset included in the first synchronization information signal may correspond to a difference between the target synchronization time and the first time.

The identifying may comprise: identifying information of the first time at which the first synchronization information signal is transmitted, based on the information on the first synchronization reference time; and calculating, as the target synchronization time, a time after a time corresponding to the first offset elapses from the first time based on the information on the first time and the information on the first offset.

The first synchronization reference time included in the first synchronization information signal may correspond to the target synchronization time, and the first offset included in the first synchronization information signal may correspond to a difference between the target synchronization time and the first time.

The identifying may comprise: identifying information on the target synchronization time based on the information on the first synchronization reference time; and calculating, as the first time at which the first synchronization information signal is transmitted, a time preceding the target synchronization time by the first offset based on the information on the target synchronization time and the information on the first offset.

The identifying may comprise calculating information on a time at which the first synchronization information signal is received based on information on a previously identified propagation delay between the first communication node and the second communication node and the information on the first time at which the first synchronization information signal is transmitted.

The synchronization method may further comprise, before the receiving the first synchronization information signal, setting the synchronization timer to an idle state.

The synchronization method may further comprise, after the setting of the synchronization timer, receiving a second synchronization information signal from the second communication node; identifying information on a second synchronization reference time and information on a second offset included in the second synchronization information signal; identifying a remaining time of the synchronization timer corresponding to a time remaining before the synchronization timer expires at a time at which the second synchronization information signal is received; comparing the identified remaining time of the synchronization timer with the second offset; and updating the synchronization timer based on a result of the comparing.

The updating may comprise maintaining the synchronization timer when the identified remaining time of the synchronization timer is equal to the second offset.

The updating may comprise updating the synchronization timer based on a timer update value selected according to a predetermined selection criterion when the identified remaining time of the synchronization timer is not equal to the second offset, and the time update value may be selected among a smaller value among the remaining time of the synchronization timer and the second offset, a larger value among the remaining time of the synchronization timer and the second offset, an intermediate value between the remaining time of the synchronization timer and the second offset, and a value of the second offset.

The synchronization method may further comprise, after the determining that time synchronization with the second communication node is acquired, performing a first operation instructed by the second communication node to be performed in a state of being time-synchronized with the second communication node.

According to another exemplary embodiment of the present disclosure for achieving the above-described objective, a first communication node performing a synchronization operation in a communication system may comprise: a processor; a memory electronically communicating with the processor; and instructions stored in the memory, wherein when executed by the processor, the instructions cause the first communication node to: receive, from a second communication node of the communication system, a first synchronization information signal including information on a first synchronization reference time and information on a first offset; identify information on a first time at which the first synchronization information signal is transmitted and information on a target synchronization time configured by the second communication node, based on the information included in the first synchronization information signal; set a synchronization timer based on the information on the first offset; and when the synchronization timer expires, determine that time synchronization with the second communication node is acquired.

The first synchronization reference time included in the first synchronization information signal may correspond to the first time, the first offset included in the first synchronization information signal may correspond to a difference between the target synchronization time and the first time, and the instructions may further cause the first communication node to: identify information of the first time at which the first synchronization information signal is transmitted, based on the information on the first synchronization reference time; and calculate, as the target synchronization time, a time after a time corresponding to the first offset elapses from the first time based on the information on the first time and the information on the first offset.

The first synchronization reference time included in the first synchronization information signal may correspond to the target synchronization time, the first offset included in the first synchronization information signal may correspond to a difference between the target synchronization time and the first time, and the instructions further cause the first communication node to: identify information on the target synchronization time based on the information on the first synchronization reference time; and calculate, as the first time at which the first synchronization information signal is transmitted, a time preceding the target synchronization time by the first offset based on the information on the target synchronization time and the information on the first offset.

The instructions may further cause the first communication node to: receive a second synchronization information signal from the second communication node; identify information on a second synchronization reference time and information on a second offset included in the second synchronization information signal; identify a remaining time of the synchronization timer corresponding to a time remaining before the synchronization timer expires at a time at which the second synchronization information signal is received; compare the identified remaining time of the synchronization timer with the second offset; and update the synchronization timer based on a result of the comparing.

According to an exemplary embodiment of the present disclosure, a central node constituting a communication system may set a predetermined target synchronization time for a synchronization operation with one or more terminals. The central node may transmit a synchronization information signal including synchronization information set based on the target synchronization time and a current time in a broadcast manner at a time earlier than the set target synchronization time. Each terminal may set or update a synchronization timer based on the synchronization information included in the synchronization information signal transmitted from the central node, and when the synchronization timer expires, the terminal may determine that time synchronization with the central node is acquired.

According to an exemplary embodiment of the present disclosure, a plurality of terminals may easily acquire mutual time synchronization based on the synchronization information signal provided in one-way from the central node without having a separate device for mutual synchronization operation.

BRIEF DESCRIPTION OF DRAWINGS

FIGS. 3A and 3B are exemplary diagrams for describing a first exemplary embodiment of a synchronization method in a communication system.

DETAILED DESCRIPTION OF THE EMBODIMENTS

Figure 1:
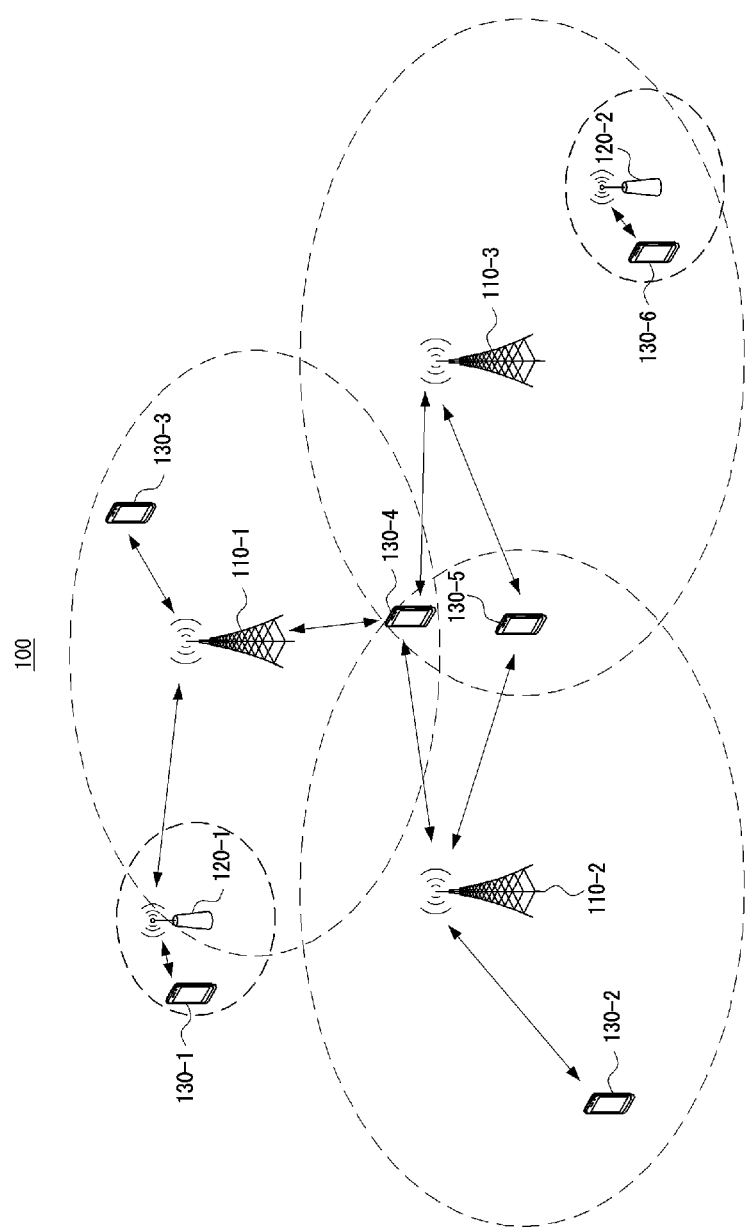
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
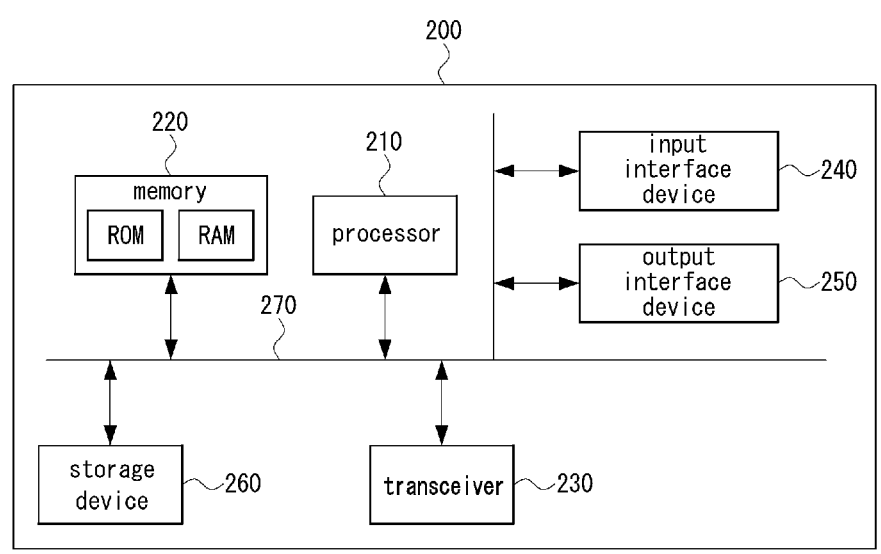
FIG. 2 is a block diagram illustrating a first exemplary embodiment of a communication node.

FIG. 2 is a block diagram illustrating a first exemplary embodiment of a communication node.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, synchronization methods in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3A:
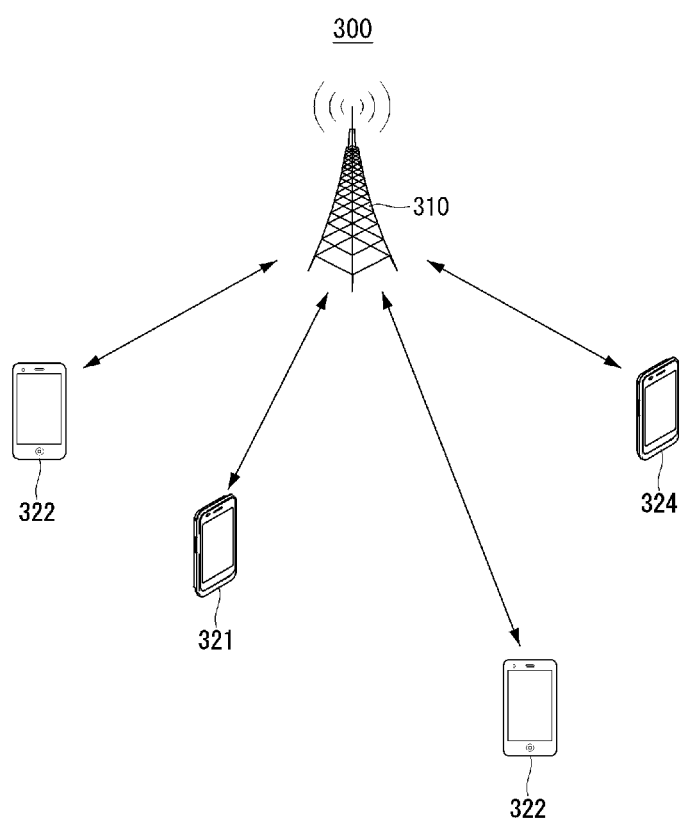

FIGS. 3A and 3B are exemplary diagrams for describing a first exemplary embodiment of a synchronization method in a communication system.

Referring to FIG. 3A, a communication system 300 may include one central node and one or more terminals. The one central node and the one or more terminals may perform operations for a synchronization procedure. The central node may transmit a signal including predetermined synchronization information to the one or more terminals. The one or more terminals may receive the signal transmitted from the central node to obtain the synchronization information. It can be seen that FIG. 3A shows an exemplary embodiment in which the communication system 300 includes one central node 310 and four terminals 321, 322, 323, and 324. However, this is only an example for convenience of description, and exemplary embodiments of the present disclosure are not limited thereto.

The communication system 300 may include the central node 310, the first terminal 321, the second terminal 322, the third terminal 323, and the fourth terminal 324. The first to fourth terminals 321, . . . , and 324 may acquire the same time synchronization with each other. The first to fourth terminals 321, . . . , and 324 may acquire the same time synchronization with each other through the central node 310. In an exemplary embodiment of the communication system 300, the first to fourth terminals 321, . . . , and 324 may be sensor nodes or operation nodes constituting an IoT communication network. The first to fourth terminals 321, . . . , and 324 may be independent terminals. The first to fourth terminals 321, . . . , and 324 may perform only communication with the central node 310 without performing mutual communications.

In an exemplary embodiment of the communication system 300, the central node 310 may correspond to a base station to which the first to fourth terminals 321, . . . , and 324 are connected. Alternatively, the central node 310 may correspond to an access point (AP) or gateway (GW) connected to the first to fourth terminals 321, . . . , and 324. Alternatively, the central node 310 may correspond to a sink node that manages a sensor network including the first to fourth terminals 321, . . . , and 324 which are sensor nodes.

In an IoT communication system that may include a plurality of terminals, each of the terminals may have to be implemented at low cost due to a cost problem. Accordingly, it may be difficult for each of the terminals to include a high-performance device for synchronization. Accordingly, it may not be easy to maintain synchronization between the terminals. In particular, in the case of low-cost terminals, it may not be easy to maintain synchronization and perform data transmission/reception based on monitoring of a plurality of different radio channels.

Meanwhile, in an exemplary embodiment of the communication system, operations performed by each terminal, such as collection of measurement data and transmission of command signals, may have to be performed in a time-synchronized state. For example, in a communication system that is applied to fields that require accurate data measurement and command execution, such as construction sites, industrial sites, telemedicine surgery, automatic distributed control of smart grids, and safe transportation system control, high-precision time synchronization between terminals that perform sensing or commanded operations may be required. For example, if time synchronization between terminals, which are sensor nodes, is not maintained, it may not be easy to accurately analyze a correlation between sensing data received from the respective sensor nodes. In this reason, a synchronization technique, for enabling each of the terminals configured at low cost to easily maintain time synchronization and perform a role in a situation where time-synchronized data collection or command execution is important, may be required.

Referring to FIG. 3B, in the communication system 300, the central node 310 may perform a synchronization procedure with the first to fourth terminals 321, . . . , and 324 requiring synchronization acquisition and maintenance. The central node 310 may transmit a signal including synchronization information for synchronization operations in the first to fourth terminals 321, . . . , and 324. The central node 310 may be referred to as a 'synchronization information transmission device'. The signal including the synchronization information, which is transmitted by the central node 310, may be referred to as a 'synchronization information signal'. The synchronization information signal may be referred to as a 'synchronization measurement signal'.

The synchronization information signal may include information for the central node 310 to synchronize with the first to fourth terminals 321, . . . , and 324 based on a predetermined target synchronization time corresponding to a target synchronization reference point. Here, the target synchronization time may be determined based on absolute time information such as a coordinated universal time (UTC). Alternatively, the target synchronization time may be determined based on network time information or network synchronization time information configured by the communication system 300 or a communication network connected to the communication system 300. The target synchronization time may also be referred to as a 'target synchronization time point'.

For example, in FIG. 3B, the central node 310 may configure UTC 1,565,568,060 as the target synchronization time, and transmit a synchronization information signal so that the first to fourth terminals 321, . . . , and 324 are synchronized based on the configured target synchronization time. The central node 310 may transmit the synchronization information signal at a time earlier than the target synchronization time corresponding to UTC 1,565,568,060. In an exemplary embodiment of the communication system 300, the synchronization information signal may be transmitted in a broadcast manner. The operation in which the central node 310 transmits the synchronization information signal in a broadcast manner may be referred to as 'synchronization information broadcasting'. Alternatively, in another exemplary embodiment of the communication system 300, the synchronization information signal may be transmitted in a unicast or multicast manner.

The central node 310 may perform the synchronization information broadcasting operation one or more times prior to the target synchronization time. Here, the synchronization information signal may include information on a time at which the synchronization information signal is transmitted. The synchronization information signal may include an offset value between the time at which the synchronization information signal is transmitted and the target synchronization time. The terminal receiving the synchronization information signal may calculate the target synchronization time based on the information included in the synchronization information signal. However, this is only an example for convenience of description, and exemplary embodiments of the present disclosure are not limited thereto. For example, the synchronization information signal may include information on the target synchronization time and the offset value between the time at which the synchronization information signal is transmitted and the target synchronization time. In this case, the terminal receiving the synchronization information signal may identify a time at which the synchronization information signal is received, based on the information included in the synchronization information signal.

In an exemplary embodiment of the communication system 300, tine information included in the synchronization information signal may be set based on UTC. Alternatively, time information included in the synchronization information signal may be set based on a time reference set by the central node 310 or the communication system 300. The central node 310 may set a predetermined real value corresponding to the determined target synchronization time. For example, the central node 310 may set its own time reference in which the time value of the determined target synchronization time is 0. In this case, the synchronization information signal transmitted by the central node 310 may include information indicating that the time value or the target synchronization time is 0, and an offset value between the time at which the synchronization information signal is transmitted and the target synchronization time. Alternatively, the synchronization information signal transmitted by the central node 310 may include the offset value, without including information on the target synchronization time. Upon receiving the synchronization information signal, the terminal may set a timer based on the offset value, and may set a time reference in which a time value at which the timer expires is 0.

The central node 310 may broadcast a first synchronization information signal at a first time of UTC 1,565,568,000. The first time may correspond to a time earlier by 60 than the target synchronization time of UTC 1,565,568,060. The first synchronization information signal may include information of UTC 1,565,568,000 UTC that is the first time. The first synchronization information signal may include information of a first offset 60 that is a time interval between the first time and the target synchronization time. The terminal receiving the first synchronization information signal may identify that a current time is UTC 1,565,568,000 based on the first synchronization information signal, and that the target synchronization time configured by the central node 310 is UTC 1,565,568,060 that is later by 60 than the current time.

The central node 310 may broadcast a second synchronization information signal at a second time of UTC 1,565, 568,020. The second time may correspond to a time earlier by 40 than the target synchronization time of UTC 1,565, 568,060. The second synchronization information signal may include information of UTC 1,565,568,020 that is the second time. The second synchronization information signal may include information of a second offset 40 that is a time interval between the second time and the target synchronization time. The terminal receiving the second synchronization information signal may identify that a current time is UTC 1,565,568,020, and that the target synchronization time configured by the central node 310 is UTC 1,565,568,060 that is later by 40 than the current time.

The central node 310 may broadcast a third synchronization information signal at a third time of UTC 1,565,568, 032. The third time may correspond to a time earlier by 28 than the target synchronization time of UTC 1,565,568,060. The third synchronization information signal may include information of UTC 1,565,568,030 that is the third time. The third synchronization information signal may include information of a third offset 28 that is a time interval between the third time and the target synchronization time. The terminal receiving the third synchronization information signal may identify that a current time is UTC 1,565,568,032, and that the target synchronization time configured by the central node 310 is UTC 1,565,568,060 that is later by 28 than the current time.

The central node 310 may broadcast a fourth synchronization information signal at a fourth time of UTC 1,565, 568,054. The fourth time may correspond to a time earlier by 6 than the target synchronization time of UTC 1,565,568, 060. The fourth synchronization information signal may include information of UTC 1,565,568,054 that is the fourth time. The fourth synchronization information signal may include information of a fourth offset 6 that is a time interval between the fourth time and the target synchronization time. The terminal receiving the fourth synchronization information signal may identify that a current time is UTC 1,565, 568,054, and that the target synchronization time configured by the central node 310 is UTC 1,565,568,060 that is later by 6 than the current time.

The first terminal 321 may succeed in receiving the second and fourth synchronization information signals. On the other hand, the first terminal 321 may fail to receive the first and third synchronization information signals. The second terminal 322 may succeed in receiving the first, third, and fourth synchronization information signals. On the other hand, the second terminal 322 may fail to receive the second synchronization information signal. The third terminal 323 may succeed in receiving the first and fourth synchronization information signals. On the other hand, the third terminal 323 may fail to receive the second and third synchronization information signals. The fourth terminal 324 may succeed in receiving the second and fourth synchronization information signals. On the other hand, the fourth terminal 324 may fail to receive the first and third synchronization information signals.

Each of the first to fourth terminals 321, . . . , and 324 may not have excellent communication quality with the central node 310 or the reception performance of the terminal itself may not be excellent. Thus, in a situation where a transmission success rate of wireless communication packets is low, each terminal may receive only some of the synchronization information signals transmitted a plurality of times from the central node 310. Even if each of the first to fourth terminals 321, . . . , and 324 does not receive all the synchronization information signals transmitted from the central node 310, the terminal may identify the current time and the target synchronization time based on the received synchronization information signals.

The central node 310 may perform the synchronization information broadcasting a plurality of times before the target synchronization time, so that all terminals constituting the communication system 300 can be time-synchronized to the target synchronization time. Through this, the terminals constituting the communication system 300 may easily acquire group synchronization without using internal synchronization clocks or separate equipments for time synchronization. Here, the number of times the central node 310 performs the synchronization information broadcasting may be set to a value that a person skilled in the art determines is necessary for time synchronization to the target synchronization time without omission. The intervals between the respective times at which the central node 310 performs the synchronization information broadcasting may be set to be constant or may be set to be not constant.

Figure 4:
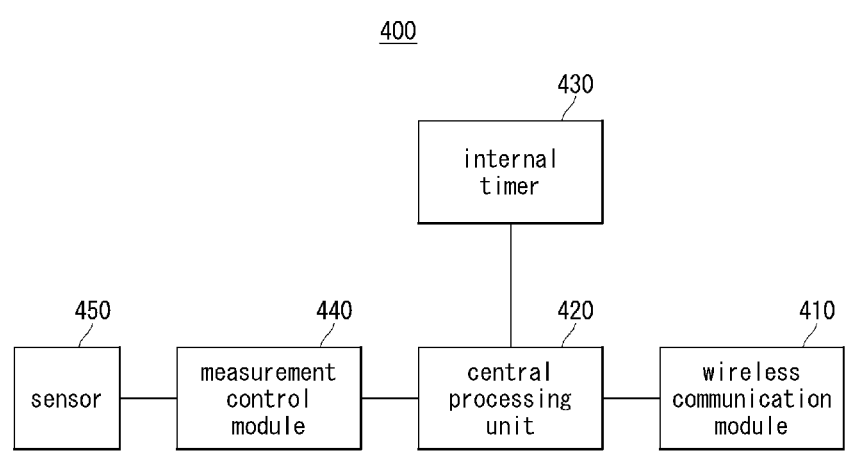
FIG. 4 is a conceptual diagram illustrating a second exemplary embodiment of a communication node.

FIG. 4 is a conceptual diagram illustrating a second exemplary embodiment of a communication node.

Referring to FIG. 4, a communication node 400 may be configured to be the same as or similar to the first to fourth terminals 321, . . . , and 324 described with reference to FIGS. 3A and 3B. The communication node 400 may include components for performing the operations according to the first exemplary embodiment of the synchronization method in the communication system described with reference to FIGS. 3A and 3B. For example, when the communication node is a sensor node, the communication node 400 may include a wireless communication module 410, a central processing unit 420, an internal timer 430, a measurement control module 440, and a sensor 450. The communication node 400 may further include a memory (not shown), a storage device (not shown), an input interface device (not shown), an output interface device (not shown), and the like. Hereinafter, in describing the second exemplary embodiment of the communication node with reference to FIG. 4, content overlapping with those described with reference to FIGS. 1 to 3B may be omitted.

The wireless communication module 410 may perform wireless communications between the communication node 400 and another communication node. The wireless communication module 410 may be the same as or similar to the transceiver 230 of the communication node 200 described with reference to FIG. 2. Alternatively, the wireless communication module 410 may be the same as or similar to the communication node 200 described with reference to FIG. 2. The communication node 400 may receive a synchronization information signal transmitted from a central node (not shown) of the communication system through the wireless communication module 410.

The central processing unit 420 may control the operations of the communication node 400. The central processing unit 420 may perform an operation based on information obtained by the communication node 400 and determine the operations of the communication node 400. The central processing unit 420 may be the same as or similar to the processor 210 of the communication node 200 described with reference to FIG. 2. The central processing unit 420 may obtain information on a current time and information on an offset included in the synchronization information signal. The central processing unit 420 may calculate a target synchronization time based on the information on the current time and the information on the offset.

The internal timer 430 may operate based on a predetermined timer setting value provided from the central processing unit 420. For example, when a predetermined timer setting value is provided from the central processing unit 420 in an idle state of the internal timer 430, the internal timer 430 may perform a timer operation based on the provided timer setting value. Here, the timer setting value provided from the central processing unit 420 may be determined based on the offset included in the synchronization information signal received by the communication node 400. For example, when the offset identified based on the information included in the synchronization information signal received by the communication node 400 is 40 (i.e., in UTC units), the internal timer 430 may start a timer operation so that the internal timer 430 is to expire after a time corresponding to 40 elapses. The internal timer 430 may provide information indicating expiration of the timer to the central processing unit 420 after the time corresponding to 40 elapses. Thereafter, the internal timer 430 may enter the idle state again. If a timer setting value is additionally provided from the central processing unit 420 during the timer operation, the internal timer 430 may update the timer expiration time based on the additionally provided timer setting value.

When the information indicating expiration of the internal timer 430 is provided from the internal timer 430, the central processing unit 420 may determine that time synchronization with the central node (not shown) is acquired. When it is determined that time synchronization with the central node (not shown) is acquired, the central processing unit 420 may control the communication node 400 to perform operations to be performed in the time-synchronized state. For example, when it is determined that time synchronization with the central node (not shown) is acquired, the central processing unit 420 may instruct the measurement control module 440 to perform a measurement operation through the sensor 450. However, this is only an example for convenience of description, and exemplary embodiments of the present disclosure are not limited thereto. For example, when the communication node 400 is not a sensor node but an operation node that performs a predetermined operation indicated by the central node (not shown), the communication node 400 may include an operation control module and an operation unit. When it is determined that time synchronization with the central node (not shown) is acquired, the central processing unit 420 may instruct the operation control module to control operations of the operation unit.

The measurement control module 440 may perform a measurement operation through the sensor 450 according to an instruction of the central processing unit 420. The measurement control module 440 may transmit measurement data obtained through the sensor 450 to the central processing unit 420. The central processing unit 420 may deliver the measurement data transmitted from the measurement control module 440 and information on a time corresponding thereto to the wireless communication module 410. The wireless communication module 410 may transmit the measurement data and the information on the corresponding time to the central node (not shown). Through this, the communication node 400 may perform the measurement operation in the state of being time-synchronized with the central node (not shown), and transmit the measurement data and the information on the corresponding time to the central node (not shown).

Figure 5:
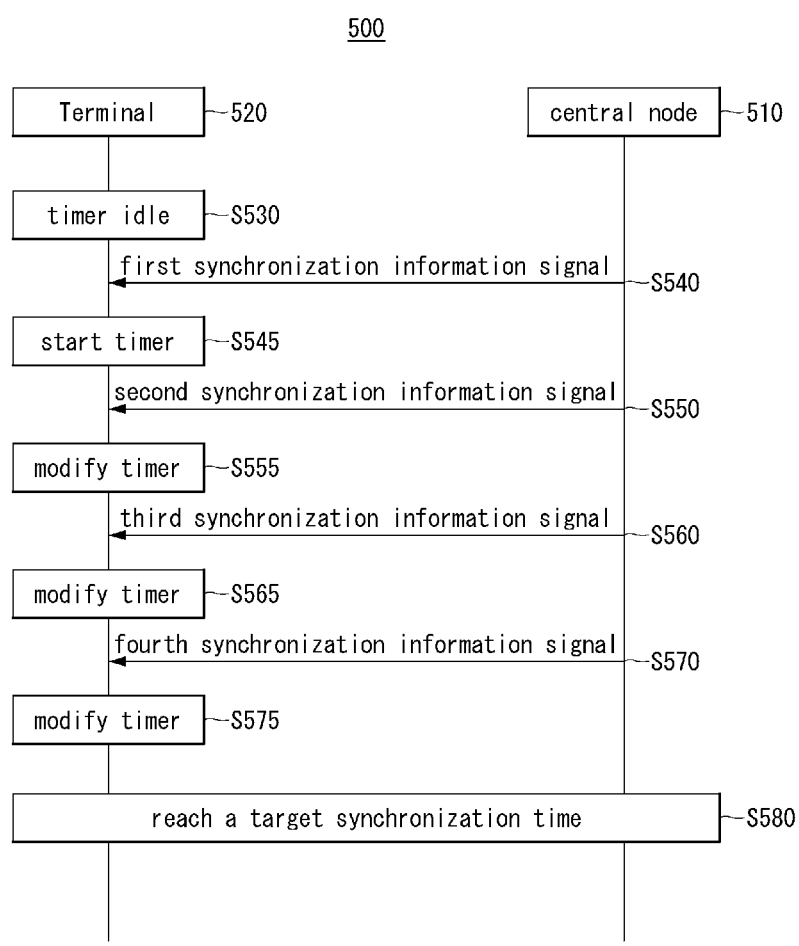
FIG. 5 is a sequence chart for describing a second exemplary embodiment of a synchronization method in a communication system.

FIG. 5 is a sequence chart for describing a second exemplary embodiment of a synchronization method in a communication system.

Referring to FIG. 5, a communication system 500 may include one central node and one or more terminals. The one central node may be the same as or similar to the central node 310 described with reference to FIGS. 3A and 3B. The one or more terminals may be the same as or similar to the first to fourth terminals 321, 322, 323, and 324 described with reference to FIGS. 3A and 3B. It can be seen that FIG. 5 shows an exemplary embodiment in which the communication system 500 includes one central node 510 and one terminals 520. However, this is only an example for convenience of description, and exemplary embodiments of the present disclosure are not limited thereto. Hereinafter, in describing the second exemplary embodiment of the synchronization method in the communication system with reference to FIG. 5, the content overlapping with those described with reference to FIGS. 1 to 4 may be omitted.

The terminal 520 may set a timer based on a synchronization information signal transmitted from the central node 510 and may perform a synchronization operation according to the operation of the timer. Here, the timer may be the same as or similar to the internal timer 430 described with reference to FIG. 4. The terminal 520 may set the timer to the idle state before receiving a synchronization information signal from the central node 510 (S530).

The central node 510 may configure a target synchronization time. The target synchronization time may also be referred to as a 'target synchronization time point'. The central node 510 may transmit the synchronization information signal more than once before the configured target synchronization time. The synchronization information signal may be transmitted in a broadcast manner. For example, the central node 510 may transmit first to fourth synchronization information signals in a broadcast manner before the configured target synchronization time. Here, the first to fourth synchronization information signals may be the same as or similar to the first to fourth synchronization information signals described with reference to FIG. 3B.

Specifically, the central node 510 may transmit, at a first time earlier than the target synchronization time, the first synchronization information signal including the target synchronization time and synchronization information configured based on the first time (S540). Here, the first synchronization information signal may include information on the first time and information on a first offset corresponding to a difference between the first time and the target synchronization time.

The terminal 520 may receive the first synchronization information signal from the central node 510 (S540). The terminal 520 may identify the information of the first time and the information of the first offset based on the first synchronization information signal. The terminal 520 may identify a current time based on the information included in the first synchronization information signal. Here, the terminal 520 may determine that the current time corresponds to the first time. Alternatively, the terminal 520 may calculate the current time based on a previously identified propagation delay (PD) between the central node 510 and the terminal 520 and the information on the first time. For example, the terminal 520 may determine that the current time corresponds to a time after a time corresponding to the identified PD elapses from the first time. To this end, the terminal 520 may perform an operation of identifying the PD with the central node 510 in advance. Alternatively, the central node 510 may perform an operation of identifying the PD with the terminal 520, and may transmit the identified PD by including it in the first synchronization information signal and other synchronization information signals.

The terminal 520 may start a timer based on the information included in the first synchronization information signal (S545). Here, the timer may be set to expire after a time corresponding to the first offset elapses.

The central node 510 may transmit, at a second time earlier than the target synchronization time, the second synchronization information signal including the target synchronization time and synchronization information configured based on the second time (S550). Here, the second synchronization information signal may include information on the second time and information on a second offset corresponding to a difference between the second time and the target synchronization time.

The terminal 520 may receive the second synchronization information signal from the central node 510 (S550). The terminal 520 may identify the information of the second time and the information of the second offset based on the second synchronization information signal. The terminal 520 may update or modify the current time and the timer setting based on the information included in the second synchronization information signal (S555).

For example, when the reception performance and processing performance of the terminal 520 are not excellent, a communication environment between the terminal 520 and the central node 510 is not excellent, or the communication environment between the terminal 520 and the central node 510 is changed, it may be necessary to update the information obtained and calculated by the terminal 520 through the first synchronization information signal. Alternatively, when the central node 510 modifies or updates the target synchronization time, it may be necessary to update the information obtained and calculated by the terminal 520 through the first synchronization information signal.

The terminal 520 may identify the information of the first time included in the first synchronization information signal, and may determine a current time according to a lapse of time. The terminal 520 may compare the current time determined by itself as described above with the second time included in the second synchronization information signal. If the current time determined by itself and the second time match, an addition update or modification may not be required. On the other hand, if the current time determined by itself and the second time do not match, the terminal 520 may update the current time based on a predetermined selection criterion. For example, the terminal 520 may select an earlier time among the current time determined by itself and the second time. Alternatively, the terminal 520 may select a later time among the current time determined by itself and the second time. Alternatively, the terminal 520 may select an average value or an intermediate value between the second time determined by itself and the current time. Alternatively, the terminal 520 may select the second time, which is information most recently provided from the central node 510. The terminal 520 may update the current time based on the selected time.

Meanwhile, with respect to the timer set based on the information of the first offset included in the first synchronization information signal, the terminal 520 may identify a remaining time of the timer, which is a time remaining before the timer expires. The terminal 520 may compare the currently identified remaining time of the timer and the second offset included in the second synchronization information signal. If the currently identified remaining time of the timer matches the second time, an additional update or modification may not be required. On the other hand, if the currently identified remaining time of the timer and the second offset do not match, the terminal 520 may update the remaining time of the timer based on a predetermined selection criterion. For example, the terminal 520 may select a smaller value among the currently identified remaining time of the timer and the second offset. Alternatively, the terminal 520 may select a larger value among the currently identified remaining time of the timer and the second offset. Alternatively, the terminal 520 may select an average value or an intermediate value of the currently identified remaining time of the timer and the second offset. Alternatively, the terminal 520 may select the second offset, which is information most recently provided from the central node 510. The terminal 520 may update the remaining time of the timer based on the selected time.

The central node 510 may transmit, at a third time earlier than the target synchronization time, the third synchronization information signal including the target synchronization time and synchronization information configured based on the third time (S560). Here, the third synchronization information signal may include information on the third time and information on a third offset corresponding to a difference between the third time and the target synchronization time.

The terminal 520 may receive the third synchronization information signal from the central node 510 (S560). The terminal 520 may identify the information of the third time and the information of the third offset based on the third synchronization information signal. The terminal 520 may update or modify the current time and the timer setting based on the information included in the third synchronization information signal (S565). The operation in the step S565 may be the same as or similar to the operation in the step S555.

The central node 510 may transmit, at a fourth time earlier than the target synchronization time, the fourth synchronization information signal including the target synchronization time and synchronization information configured based on the fourth time (S570). Here, the fourth synchronization information signal may include information on the fourth time and information on a fourth offset corresponding to a difference between the fourth time and the target synchronization time.

The terminal 520 may receive the fourth synchronization information signal from the central node 510 (S570). The terminal 520 may identify the information of the fourth time and the information of the fourth offset based on the fourth synchronization information signal. The terminal 520 may update or modify the current time and the timer setting based on the information included in the fourth synchronization information signal (S575). The operation in the step S575 may be the same as or similar to the operation in the step S555.

The timer of the terminal 520, which is set and updated through the steps S540 to S575, may expire at a time equal or close to the target synchronization time configured by the central node 510. That is, it can be seen that the terminal 520 acquires time synchronization with the central node 510 at the target synchronization time configured by the central node 510.

Figure 6:
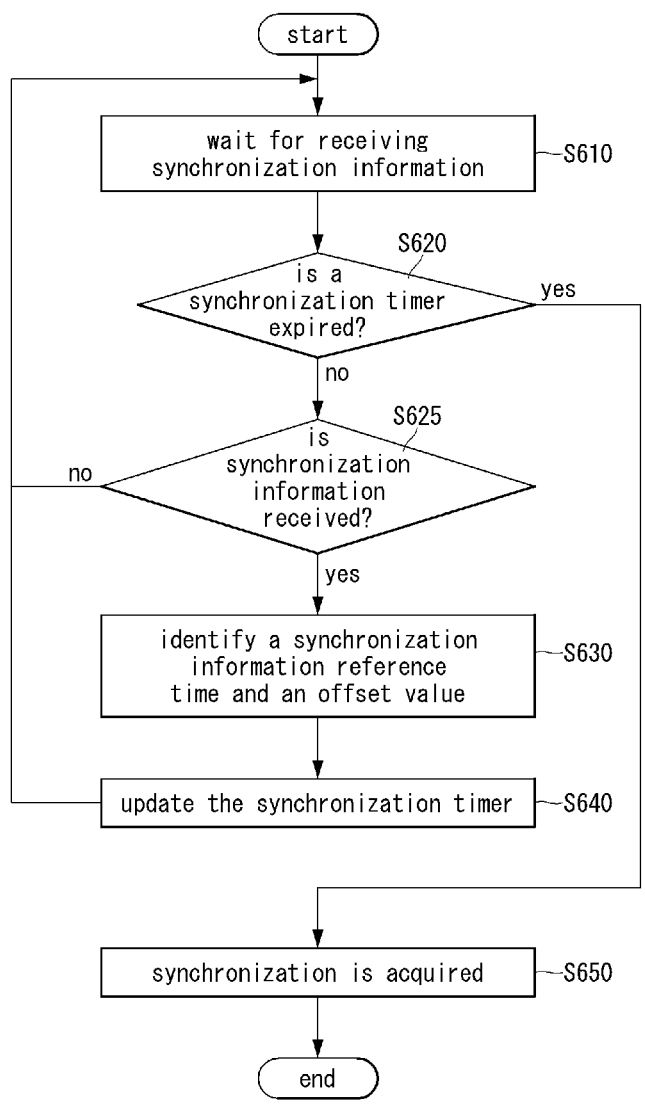
FIG. 6 is a sequence chart for describing a third exemplary embodiment of a synchronization method in a communication system.

FIG. 6 is a sequence chart for describing a third exemplary embodiment of a synchronization method in a communication system.

Referring to FIG. 6, a first communication node included in a communication system may perform a synchronization operation based on a synchronization information signal received from a second communication node included in the communication system. Here, the first communication node may be the same as or similar to the terminal 520 described with reference to FIG. 5. The second communication node may be the same as or similar to the central node 510 described with reference to FIG. 5. Hereinafter, in describing the third exemplary embodiment of the synchronization method in the communication system with reference to FIG. 6, the content overlapping with those described with reference to FIGS. 1 to 5 may be omitted.

The first communication node may wait to receive synchronization information from the second communication node (S610). The first communication node may monitor a synchronization information signal including the synchronization information transmitted from the second communication node. The first communication node may identify whether a synchronization timer included in the first communication node expires (S620). Here, the synchronization timer may be the same as or similar to the timer of the terminal 520 described with reference to FIG. 5. If the synchronization timer is in the idle state or the synchronization timer is in operation but is not expired (S620), the first communication node may identify whether the synchronization information signal including the synchronization information is received from the second communication node (S625). If the synchronization information signal is not received (S625), the first communication node may wait again to receive the synchronization information (S610). On the other hand, if the synchronization information signal is received (S625), the first communication node may identify information on a synchronization information reference time point and information on an offset value, which are included in the synchronization information signal. Here, the synchronization information reference time point may correspond to information of a current time provided by the second communication node. Alternatively, the synchronization information reference time point may correspond to a target synchronization time configured by the second communication node. The offset value may correspond to a difference between the current time and the target synchronization time. The first communication node may identify information on the current time, information on the target synchronization time, and the like, based on the information included in the synchronization information signal.

The first communication node may set or update the synchronization timer based on the information identified in the step S630 (S640). If the synchronization timer is in the idle state, the operation in the step S640 may be the same as or similar to the operation in the step S545 described with reference to FIG. 5. On the other hand, if the synchronization timer is set and is in operation, the operation in the step S640 may be the same as or similar to the operation in the step S555 described with reference to FIG. 5. After setting or updating the synchronization timer, the first communication node may wait again to receive synchronization information (S610).

If the synchronization timer expires (S620), the first communication node may determine that time synchronization with the second communication node is acquired at the corresponding time (S650). The time at which the synchronization timer expires may be equal to or close to the target synchronization time configured by the second communication node.

Meanwhile, the communication system may further include a third communication node that is the same as or similar to the terminal 520 described with reference to FIG. 5. The third communication node may acquire time synchronization with the second communication node through the same or similar operations as those of the first communication node shown in FIG. 6. The first and third communication nodes may acquire time synchronization with the second communication node at the same or close time point. In other words, the first and third communication nodes may be time-synchronized with the second communication node at the target synchronization time configured by the second communication node by receiving the synchronization information signal repeatedly provided a plurality of times from the second communication node. A terminal group including the first and third communication nodes may acquire time synchronization within the group by setting an internal timer based on the synchronization information signal provided in one-way from the second communication node without having a separate device such as a global synchronization clock for mutual synchronization.

According to an exemplary embodiment of the present disclosure, a central node constituting a communication system may set a predetermined target synchronization time for a synchronization operation with one or more terminals. The central node may transmit a synchronization information signal including synchronization information set based on the target synchronization time and a current time in a broadcast manner at a time earlier than the set target synchronization time. Each terminal may set or update a synchronization timer based on the synchronization information included in the synchronization information signal transmitted from the central node, and when the synchronization timer expires, the terminal may determine that time synchronization with the central node is acquired.

According to an exemplary embodiment of the present disclosure, a plurality of terminals may easily acquire mutual time synchronization based on the synchronization information signal provided in one-way from the central node without having a separate device for mutual synchronization operation.

However, the effects that can be achieved by the synchronization method and apparatus in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A synchronization method performed by a first communication node in a communication system, the synchronization method comprising:

receiving, from a second communication node of the communication system, a first synchronization information signal including information on a first synchronization reference time and information on a first offset;

identifying information on a first time at which the first synchronization information signal is transmitted and information on a target synchronization time configured by the second communication node, based on the information included in the first synchronization information signal;

setting a synchronization timer based on the information on the first offset; and when the synchronization timer expires, determining that time synchronization with the second communication node is acquired.

2. The synchronization method according to claim 1, wherein the first synchronization reference time included in the first synchronization information signal corresponds to the first time, and the first offset included in the first synchronization information signal corresponds to a difference between the target synchronization time and the first time.

3. The synchronization method according to claim 2, wherein the identifying comprises:

identifying information of the first time at which the first synchronization information signal is transmitted, based on the information on the first synchronization reference time; and calculating, as the target synchronization time, a time after a time corresponding to the first offset elapses from the first time based on the information on the first time and the information on the first offset.

4. The synchronization method according to claim 1, wherein the first synchronization reference time included in the first synchronization information signal corresponds to the target synchronization time, and the first offset included in the first synchronization information signal corresponds to a difference between the target synchronization time and the first time.

5. The synchronization method according to claim 4, wherein the identifying comprises:

identifying information on the target synchronization time based on the information on the first synchronization reference time; and calculating, as the first time at which the first synchronization information signal is transmitted, a time preceding the target synchronization time by the first offset based on the information on the target synchronization time and the information on the first offset.

6. The synchronization method according to claim 1, wherein the identifying comprise calculating information on a time at which the first synchronization information signal is received based on information on a previously identified propagation delay between the first communication node and the second communication node and the information on the first time at which the first synchronization information signal is transmitted.

7. The synchronization method according to claim 1, further comprising, before the receiving the first synchronization information signal, setting the synchronization timer to an idle state.

8. The synchronization method according to claim 1, further comprising, after the setting of the synchronization timer, receiving a second synchronization information signal from the second communication node;

identifying information on a second synchronization reference time and information on a second offset included in the second synchronization information signal;

identifying a remaining time of the synchronization timer corresponding to a time remaining before the synchronization timer expires at a time at which the second synchronization information signal is received;

comparing the identified remaining time of the synchronization timer with the second offset; and updating the synchronization timer based on a result of the comparing.

9. The synchronization method according to claim 8, wherein the updating comprises maintaining the synchronization timer when the identified remaining time of the synchronization timer is equal to the second offset.

10. The synchronization method according to claim 8, wherein the updating comprises updating the synchronization timer based on a timer update value selected according to a predetermined selection criterion when the identified remaining time of the synchronization timer is not equal to the second offset, and the time update value is selected among a smaller value among the remaining time of the synchronization timer and the second offset, a larger value among the remaining time of the synchronization timer and the second offset, an intermediate value between the remaining time of the synchronization timer and the second offset, and a value of the second offset.

11. The synchronization method according to claim 1, further comprising, after the determining that time synchronization with the second communication node is acquired, performing a first operation instructed by the second communication node to be performed in a state of being time-synchronized with the second communication node.

12. A first communication node performing a synchronization operation in a communication system, the first communication node comprising:

a processor;

a memory electronically communicating with the processor; and instructions stored in the memory, wherein when executed by the processor, the instructions cause the first communication node to:

receive, from a second communication node of the communication system, a first synchronization information signal including information on a first synchronization reference time and information on a first offset;

identify information on a first time at which the first synchronization information signal is transmitted and information on a target synchronization time configured by the second communication node, based on the information included in the first synchronization information signal;

set a synchronization timer based on the information on the first offset; and when the synchronization timer expires, determine that time synchronization with the second communication node is acquired.

13. The first communication node according to claim 12, wherein the first synchronization reference time included in the first synchronization information signal corresponds to the first time, the first offset included in the first synchronization information signal corresponds to a difference between the target synchronization time and the first time, and the instructions further cause the first communication node to:

identify information of the first time at which the first synchronization information signal is transmitted, based on the information on the first synchronization reference time; and calculate, as the target synchronization time, a time after a time corresponding to the first offset elapses from the first time based on the information on the first time and the information on the first offset.

14. The first communication node according to claim 12, wherein the first synchronization reference time included in the first synchronization information signal corresponds to the target synchronization time, the first offset included in the first synchronization information signal corresponds to a difference between the target synchronization time and the first time, the instructions further cause the first communication node to:

identify information on the target synchronization time based on the information on the first synchronization reference time; and calculate, as the first time at which the first synchronization information signal is transmitted, a time preceding the target synchronization time by the first offset based on the information on the target synchronization time and the information on the first offset.

15. The first communication node according to claim 12, wherein the instructions further cause the first communication node to:

receive a second synchronization information signal from the second communication node;

identify information on a second synchronization reference time and information on a second offset included in the second synchronization information signal;

identify a remaining time of the synchronization timer corresponding to a time remaining before the synchronization timer expires at a time at which the second synchronization information signal is received;

compare the identified remaining time of the synchronization timer with the second offset; and update the synchronization timer based on a result of the comparing.

* * * * *